UNITED STATES PATENT OFFICE.

JAMES O. HANDY AND ROBERT M. ISHAM, OF PITTSBURGH, PENNSYLVANIA, ASSIGNORS, BY MESNE ASSIGNMENTS, TO ALLEN S. DAVISON COMPANY OF PITTSBURGH, PENNSYLVANIA, A CORPORATION OF PENNSYLVANIA.

REFRACTORY AND PROCESS OF MAKING SAME.

1,248,486.  Specification of Letters Patent.  Patented Dec. 4, 1917.

No Drawing.  Application filed March 29, 1917. Serial No. 158,453.

*To all whom it may concern:*

Be it known that we, JAMES O. HANDY and ROBERT M. ISHAM, citizens of the United States, and residents of Pittsburgh, in the county of Allegheny and State of Pennsylvania, have invented certain new and useful Improvements in Refractories and Processes of Making Same, of which the following is a specification.

This invention relates to refractories and processes of making same; and it comprises a refractory bonded article, such as a brick, made of granular dead burnt, or calcined and shrunk, dolomite (magnesian limestone) bonded by the impurities naturally present in such dolomite, the amount however of such impurities advantageously being higher than the amount naturally so present; and it comprises a method of making such bricks wherein dolomite is granulated and separated into coarser and finer material, and the latter (with or without an addition of a portion of the former) burnt to form a shaped brick of dead burnt material; all as more fully hereinafter set forth and as claimed.

For lining the bottoms of basic open hearth furnaces and similar purposes a common material is a granulated calcined dolomite. Usually it is hard burnt; that is, heated until it is not only calcined, or deprived of its carbon dioxid, but until it undergoes a shrinking or physical change rendering it hard and resistant. In the basic open hearth furnace it gives a very good lining, being simply tamped into place. Sometimes, penetration of the slag (which contains iron silicate and calcium silicate as well as other things) in use is relied upon to effect the ultimate bonding of the lining in place; sometimes, the granules are mixed with a little granulated slag before application. In both methods there is the possibility of a slaking, or atmospheric change, occurring if the granulated material is stored too long or transported; and the material is therefore usually made just before application. Better materials are now commercially made by coating or impregnating the granules with basic slag or something like it at the time of manufacture; rendering them more resistant to atmospheric influence and making them more convenient for shipment and storage.

In the usual routine method of making these granular products in the most improved way, natural dolomite or magnesian limestone is granulated to the size required, say, to pass $\tfrac{5}{16}$ths inch mesh. In this granulation considerable dust and fine material are produced and are discarded. The granules are then run through a rotary furnace much like the ordinary cement kiln, and calcined and dead burnt by exposure to a very high temperature; more or less basic slag being transmitted with them through the furnace in case the coated or impregnated granules are desired. In a typical dolomite well suited for producing these products, the impurities, that is things other than calcium carbonate and magnesium carbonate, are quite low; there may be, say, 1.5 per cent. silica and 1.4 per cent. of iron oxid and alumina together. As the dolomite loses about one half its weight in the operation, the calcined material therefore contains these impurities in about twice as great a percentage. The dust formed in the granulation is very much higher in these impurities than the granules themselves. Apparently, the impurities occur along the cracks and crevices forming lines of weakness of the original rock. We have found that this dust, which has hitherto been discarded, may be advantageously used in producing refractories, used either alone or in mixture with other material. The dolomite, and its calcined products, because of their comparative high purity, exhibit very little tendency to bond in and of themselves. As stated, they are, ordinarily, bonded by an addition of something else; very often basic slag. With the dust, the situation is different, the amount of impurities is larger. In one typical dust from a plant making refractories from dolomite, the amount of silica in the dust is about 5 per cent. while that of oxid of iron and alumina together is about 3.5 per cent. When this dust is burnt, the percentage proportions are, as before, greater; there will be about 15.5 per cent. in all of silica, oxid of iron and alumina.

We have found that if this waste dolomite dust or fine material is dead burnt as it comes, and is afterward submitted to a brick making treatment and another dead burning, we can produce strong, dense and refractory dolomite bricks which are so resistant to change and deterioration that they even exhibit no tendency to slake when placed in boiling water. For burning it is a matter of convenience to add more or less water to the dust to ball it up and form aggregates which can be handled in a rotary kiln; a rotary kiln being well adapted for this first burning. No other treatment is necessary.

It will be noted that two burning operations are involved and each is performed at a high temperature; a temperature sufficient for "dead burning", say, 2700° F. In burning magnesite and dolomite, the first action of the heat is to set free the carbon dioxid of the calcined material; but as the temperature is raised another phenomenon occurs, a shrinkage and physical change of the material. With a high degree of this shrinkage the density of the material increases and also the resistance to chemical action. Such a material is called "dead burnt". There is also a time factor involved; one or other of the burning operations must be of relatively long duration. In any particular case, we adjust temperatures and times so as to obtain the noted product: a material which will resist boiling water. This treatment with boiling water is in the nature of an "accelerated test"; and material resisting it can be handled, shipped and stored without fear of deterioration.

In a typical embodiment of the present invention as just recited, we take the dust, moisten it, burn it in a rotary kiln at a very high temperature, say, 2700-2750° F., and then crush it. The crushed material is mixed with water or with oil, tar, pitch or other material, etc., to form a temporary binder, molded and reburnt at a high temperature. The temporary binder serves in the molding operation and in reburning. On heating the molded brick containing a little oil or tar, the binder of course chars and finally disappears; but it serves to hold the particles together until the temperature is high enough to bring about union by sintering.

So strong is the bonding and protective action of this dolomite dust that we can use more or less of the granulated dolomite with it in producing refractory bricks of the stated character. The resistant nature of the final product depends in part upon the proportion of the dust which is present however high the heat or however long the time of burning. In other words, the dolomite as it runs contains too little impurity to make the highest class of refractory, while the dolomite dust contains more than is necessary. Obviously mixtures may be made. In a general way, it may be said that where the total of the oxid of iron, alumina and silica in the calcined dolomite amounts to about 6 per cent., the material can be made into high class refractory bricks. In so doing, no added bonding agent is necessary except perhaps a little water in the first burning and water, oil or the like in the second. No additions of special bonding agents need be made. With only about 6 per cent. total impurities however, the bricks will disintegrate in hot water although they may not wholly slake. As the total impurities reach 10 or 11 per cent., a stable calcined dolomite brick can be produced. In order to resist boiling water however apparently the impurities should be around or above, say, 12.5 per cent. although 10 per cent. makes a material resistant enough for all ordinary purposes. In certain typical embodiments of this phase of our invention, we made mixtures of various proportions of dolomite granules with dolomite dust. The rock granules contained 8.15 per cent. total impurities (calculated on the calcined material) and the dust 16.90 per cent. (also on basis of calcined material). Three mixtures we made contained 10.34 per cent., 12.52 per cent. and 14.71 per cent., respectively. The rock granules we ground to the same fineness as the dust, so that the powder would pass through a 10-mesh sieve. The proportions of granular material to dust in these mixtures were respectively 3:1, 1:1 and 1:3. All three samples were agglomerated with water and dried and burned at about 2700° F. All three sintered. Only the sample containing 10.34 per cent. impurities broke down in boiling water. It partially disintegrated but did not slake.

Dolomite granules of the composition given, that is, with about 8 per cent. impurities (in the calcined material), can be made into brick without the use of the dust; but the brick are not of as good quality as those made with the dust. We have found that such dolomite granules (free from screenings) after dead burning can be mixed with a temporary binder as described, molded into brick under pressure and then reburned at a temperature of 2700° F., with the production of a good and useful refractory brick; although the brick is not of as good quality as those previously described. The bricks fall to pieces in boiling water, although they do not slake completely. In cold water the brick may disintegrate after a few days; in both cases giving a sandy product having the color and approximate volume of the original product. It is therefore more advantageous to make brick with a somewhat higher content of bonding impurities than is contained in these clean granules, with a higher proportion of impurities than is contained in the original rock as a whole. As stated, this is easily accomplished by using the dust produced in granulation in making commercial granulated refractories, or some of it.

Bricks made under the present invention containing from 6 to 12 per cent. of total silica, oxid of iron and alumina, are advantageous for lining furnaces and many other purposes. They may be stored and shipped without much fear of deterioration. Where the percentage of impurities rises above 11 or 12 per cent., the bricks are however of superior quality. When the percentage of impurities rises above 17 or 18 per cent., the bricks begin to be of less refractory quality. Material with between 12.50 and 17 per cent. of impurities gives the best results.

The various burning operations described may be performed in any of the usual types of kiln or apparatus. We regard it as advantageous to perform the first burning operation in a rotary kiln fired by natural gas or other fuel in such manner as to produce very high temperatures. Other means of firing, such as "regenerated" producer gas may of course be employed.

The dolomite dust or its mixture with granulated (or re-ground granulated) material may of course be burnt to form a sintered product in granular form instead of making bricks. But we regard the brick-making operation as the most advantageous embodiment of our invention.

What we claim is:—

1. The process of making refractory materials which comprises dead burning impure dolomite, molding into brick with a temporary binder and reburning for such a time and at such a temperature as will give a permanent non-slaking material resisting hot water.

2. The process of making refractory materials which comprises dead burning dolomite containing more impurities than the amount naturally present, molding into brick with a temporary binder and reburning for such a time and at such a temperature as will give a permanent non-slaking material resisting hot water.

3. The process of making refractory materials which comprises breaking and screening dolomite, burning the finer screened material, molding into brick with a temporary binder and reburning for such a time and at such a temperature as will give a permanent non-slaking material resisting hot water.

4. The process of making refractory materials which comprises dead burning dolomitic material containing more than a total of 8 per cent. of silica, oxid of iron and alumina in the calcined material, molding into bricks with a temporary binder and reburning for such a time and at such a temperature as will give a permanent non-slaking material resisting hot water.

5. The process of making refractory materials which comprises dead burning dolomitic material containing more than a total of 11 per cent. of silica, oxid of iron and alumina in the calcined material, molding into bricks with a temporary binder and reburning for such a time and at such a temperature as will give a permanent non-slaking material resisting hot water.

6. The process of making refractory materials which comprises dead burning dolomitic material containing a total of between 11 and 18 per cent. of silica, oxid of iron and alumina in the calcined material, molding into bricks with a temporary binder and reburning for such a time and at such a temperature as will give a permanent non-slaking material resisting hot water.

7. The process of making refractory materials which comprises breaking and screening dolomite and dead burning the finer screenings to form a sintered material and reburning for such a time and at such a temperature as will give a permanent non-slaking material resisting hot water.

8. The process of making refractory materials which comprises breaking and screening dolomite and dead burning the finer screenings to form a sintered material, molding the sintered material into bricks with a temporary binder and reburning for such a time and at such temperature as will give a permanent non-slaking material resisting hot water.

9. As a new article of manufacture a refractory brick composed of sintered hard burnt dolomitic lime containing more than 8 per cent. of total silica, oxid of iron and alumina and resisting the action of boiling water.

10. As a new article of manufacture a permanent, non-slakable refractory brick composed of sintered hard burnt dolomitic lime containing more than 11 per cent. of total silica, oxid of iron and alumina, such brick being resistant to the action of boiling water.

11. As a new refractory material, a permanent, non-slakable sintered material of a composition analogous to calcined hard burnt dolomite dust but resisting the action of boiling water.

In testimony whereof, we affix our signatures hereto March 23rd, 1917.

JAMES O. HANDY
ROBT. M. ISHAM.